United States Patent
Asati et al.

(10) Patent No.: US 7,590,123 B2
(45) Date of Patent: Sep. 15, 2009

(54) METHOD OF PROVIDING AN ENCRYPTED MULTIPOINT VPN SERVICE

(75) Inventors: Rajiv Asati, Morrisville, NC (US); Mohamed Khalid, Cary, NC (US); Haseeb Niazi, Morrisville, NC (US); Vijay Bollapragada, Cary, NC (US)

(73) Assignee: Cisco Technology, Inc., San Jose, CA (US)

( * ) Notice: Subject to any disclaimer, the term of this patent is extended or adjusted under 35 U.S.C. 154(b) by 550 days.

(21) Appl. No.: 11/284,951

(22) Filed: Nov. 22, 2005

(65) Prior Publication Data

US 2007/0115990 A1 May 24, 2007

(51) Int. Cl.
*H04J 3/16* (2006.01)
*H04J 3/22* (2006.01)
*H04L 12/28* (2006.01)
*H04L 12/56* (2006.01)

(52) U.S. Cl. .............. 370/395.53; 370/469; 370/395.5; 370/400

(58) Field of Classification Search ................. 370/469, 370/395.5, 400
See application file for complete search history.

(56) References Cited

U.S. PATENT DOCUMENTS

| | | | |
|---|---|---|---|
| 6,421,321 B1 * | 7/2002 | Sakagawa et al. | 370/238.1 |
| 6,522,627 B1 * | 2/2003 | Mauger | 370/230 |
| 6,636,520 B1 * | 10/2003 | Jason et al. | 370/401 |
| 6,741,585 B1 * | 5/2004 | Munoz et al. | 370/352 |
| 7,028,332 B1 * | 4/2006 | Jason, Jr. | 726/1 |
| 7,106,740 B1 * | 9/2006 | Leelanivas et al. | 370/392 |
| 7,181,612 B1 * | 2/2007 | Pellacuru et al. | 713/153 |
| 7,366,894 B1 * | 4/2008 | Kalimuthu et al. | 713/153 |
| 2001/0037401 A1 * | 11/2001 | Soumiya et al. | 709/232 |
| 2002/0031107 A1 * | 3/2002 | Li et al. | 370/338 |
| 2002/0075866 A1 * | 6/2002 | Troxel et al. | 370/389 |
| 2002/0141378 A1 * | 10/2002 | Bays et al. | 370/351 |
| 2002/0176406 A1 * | 11/2002 | Tsukada et al. | 370/352 |
| 2003/0016672 A1 * | 1/2003 | Rosen et al. | 370/392 |
| 2003/0028804 A1 * | 2/2003 | Noehring et al. | 713/201 |
| 2003/0108041 A1 * | 6/2003 | Aysan et al. | 370/389 |
| 2003/0126468 A1 * | 7/2003 | Markham | 713/201 |
| 2003/0145227 A1 * | 7/2003 | Boden | 713/201 |
| 2003/0165160 A1 * | 9/2003 | Minami et al. | 370/466 |
| 2003/0228861 A1 * | 12/2003 | Leung et al. | 455/412.1 |
| 2003/0233576 A1 * | 12/2003 | Maufer et al. | 713/201 |
| 2004/0062267 A1 * | 4/2004 | Minami et al. | 370/463 |
| 2005/0083926 A1 * | 4/2005 | Mathews et al. | 370/389 |
| 2005/0180416 A1 * | 8/2005 | Jayawardena et al. | 370/389 |
| 2006/0002370 A1 * | 1/2006 | Rabie et al. | 370/351 |
| 2006/0268921 A1 * | 11/2006 | Ekstrom et al. | 370/437 |
| 2007/0041393 A1 * | 2/2007 | Westhead et al. | 370/428 |
| 2008/0130661 A1 * | 6/2008 | Jiang et al. | 370/401 |

* cited by examiner

*Primary Examiner*—Daniel J Ryman
*Assistant Examiner*—Andrew Oh
(74) *Attorney, Agent, or Firm*—Brinks Hofer Gilson & Lione

(57) ABSTRACT

A method, apparatus and computer program product for providing an encrypted multipoint Virtual Private Network (VPN) service is presented. A first packet of a plurality of packets is received at an ingress provider edge (PE) the plurality of packets destined for a remote server in communication with said egress PE router. A lookup for a destination prefix of a first packet is preformed, and a determination made that a next-hop for the first packet is reachable through a mGRE tunnel. A resolution request is sent to a hub to acquire a routable IP address. The packets sent to the hub are encapsulated, and encrypting until a resolution reply is received and until security associations (SAs) have been exchanged. Then a VPN is established between the ingress and egress PEs and is used for all subsequent packets.

20 Claims, 5 Drawing Sheets

METHOD OF PROVIDING AN ENCRYPTED MULTIPOINT VPN SERVICE

BACKGROUND

Computer networks typically provide a physical interconnection between different computers to allow convenient exchange of programs and data. A plurality of connectivity devices, such as switches and routers, interconnect each user computer connected to the network. The connectivity devices maintain routing information about the computers and perform routing decisions concerning message traffic passed between the computers via the connectivity devices. Each connectivity device, or router, corresponds to a network routing prefix indicative of the other computers, which it has direct, or indirect access to. Therefore, data routed from one computer to another follows a path through the network defined by the routers between the two computers.

The routers define nodes in a network, and data travels between the nodes in a series of so-called "hops" over the network. Since each router is typically connected to multiple other routers, there may be multiple potential paths between given computers. Typically, the routing information is employed in a routing table in each router, which is used to determine a path to a destination computer or network. The router makes a routing decision, using the routing table, to identify the next "hop," or next router, to send the data to in order for it to ultimately reach the destination computer.

A Virtual Private Network (VPN) is a network that uses a public telecommunication infrastructure, such as the Internet, to provide remote offices or individual users with secure access to their organization's network. A VPN works by using the shared public infrastructure while maintaining privacy through security procedures and tunneling protocols.

VPNs provide a secured means for transmitting and receiving data between network nodes even though a corresponding physical network supporting propagation of the data is shared by many users. Typically, the data transmitted between such network nodes (e.g., edge nodes of a service provider network) is encrypted to protect against eavesdropping and tampering by unauthorized parties.

One type of VPN is known as a 2547 based VPN, which allow a customer to offer VPN service using the notion of a Virtual Routing and Forwarding (VRF) instance. PE routers typically maintain VRF information in a table (a VRF table) dictating how to route and forward traffic through the shared physical network to support corresponding VPNs for the different customers. In 2547 VPNs, PE routers advertise VPN prefixes and labels (VPN_LABEL) for these prefixes using Multi-Protocol Border Gateway Protocol (MP-BGP) in the control plane. In the forwarding plane, when an IP packet arrives into a VRF, the packet is appended with two labels (e.g., an Internal Gateway Protocol label (IGP_LABEL) and a VPN_LABEL). The IGP_LABEL gets the packet to the far end PE. The VPN_LABEL associates the packet with the outgoing interface on the far end PE. 2547 VPNs inherently allow for "any2any" connectivity for a scalable VPN solution to connect thousands of sites. Many large enterprises are using 2547 VPNs for segmentation.

Another type of VPN is known as a Dynamic Multipoint VPN (DMVPN). DMVPN allows users to better scale large and small Internet Protocol Security (IPSec) VPNs by combining Generic Routing Encapsulation (GRE) tunnels, IPSec encryption, and Next Hop Resolution Protocol (NHRP) to provide users with easy configuration through cryptogrpahic profiles, which override the requirement for defining static cryptographic maps, and dynamic discovery of tunnel endpoints. NHRP is a client and server protocol where the hub is the server and the spokes are the clients.

In a DMVPN environment, each spoke has a permanent IPSec tunnel to a hub, but not to the other spokes within the network. Each spoke registers as clients of the NHRP server. The hub maintains an NHRP database of the public interface addresses of the each spoke. Each spoke registers its real address when it boots and queries the NHRP database for real addresses of the destination spokes in order to build direct tunnels.

When a spoke needs to send a packet to a destination (private) subnet on another spoke, it queries the NHRP server for the real (outside) address of the destination (target) spoke. After the originating spoke learns the peer address of the target spoke, it can initiate a dynamic IPSec tunnel to the target spoke. The spoke-to-spoke tunnel is built over the multipoint GRE (mGRE) interface. mGRE Tunnel Interfaces allow a single GRE interface to support multiple IPSec tunnels and therefore simplifies the size and complexity of the configuration.

The spoke-to-spoke links are established on demand whenever there is traffic between the spokes. Thereafter, packets are able to bypass the hub and use the spoke-to-spoke tunnel.

SUMMARY

Conventional mechanisms such as those explained above suffer from a variety of deficiencies. One such deficiency is that even though 2547 is considered implicitly secure, in certain scenarios there is a demand for encrypted 2547 VPN services. IPSec VPNs offer encrypted service but can be cumbersome to configure and manage. A combination of DMVPN over 2547 has been tried, however in such an environment all site-to-site traffic has to traverse hub before the site-to-site tunnel is formed. All decryption takes place at the hub, and all transit traffic that traverses the hub gets dropped by the hub since the hub did not assign the labels.

Embodiments of the invention significantly overcome such deficiencies and provide mechanisms and techniques that produce an encrypted multipoint VPN service. In a particular embodiment of a method for providing an encrypted multipoint VPN service, the method includes receiving a first packet of a plurality of packets at an ingress provider edge (PE) router in a network including a hub and an egress PE router. The plurality of packets are destined for a remote server in communication with the egress PE router. The method further includes performing a lookup at the ingress PE router for a destination prefix of the first packet, and determining that a next-hop for the first packet is reachable through a tunnel (e.g., an mGRE tunnel).

Additionally, the method includes sending, by the ingress PE, a resolution request to the hub to acquire a routable IP address associated with the egress PE router. The method additionally includes encapsulating, encrypting and sending the packets to the hub until a resolution reply is received by the ingress PE router and until security associations (SAs) have been exchanged between the ingress PE router and the egress PE. The packets carry a routing bit which is set in the header. The header also includes a tunnel IP address of the egress PE router.

The method further includes receiving a resolution reply from the hub at the ingress PE router, updating a next-hop cache of the ingress PE router, exchanging IPSec SAs with the egress PE router and updating an FIB entry with the SAs. The method further includes establishing a VPN between the egress PE router and the ingress PE router, and forwarding all subsequent packets of the plurality of packets destined for the egress PE router directly towards the egress PE router across the VPN established between the egress PE router and the ingress PE router.

Other embodiments include a computer readable medium having computer readable code thereon for providing an encrypted multipoint VPN service. The medium includes instructions for receiving a first packet of a plurality of packets at an ingress PE router in a network including a hub and an egress PE router, the plurality of packets destined for a remote server in communication with the egress PE router. The medium further includes instructions for performing a lookup at the ingress PE router for a destination prefix of the first packet, and determining that a next-hop for the first packet is reachable through a tunnel.

Additionally, the medium includes instructions for sending, by the ingress PE router, a resolution request to the hub to acquire a routable IP address associated with the egress PE router and further includes instructions for encapsulating, encrypting and sending the packets to the hub until a resolution reply is received by the ingress PE router and until security associations (SAs) have been exchanged between the ingress PE router and the egress PE, the packets carrying a routing bit set in the header and the header including a tunnel IP address of the egress PE router.

The medium further includes instructions for receiving a resolution reply from the hub at the ingress PE router, updating a next-hop cache of the ingress PE router, exchanging IPSec SAs with the egress PE router and updating an FIB entry with the SAs. The medium additionally includes instructions for establishing a VPN between the egress PE router and the ingress PE router, and forwarding all subsequent packets of the plurality of packets destined for the egress PE router directly towards the egress PE router across the VPN established between the egress PE router and the ingress PE router.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides providing an encrypted multipoint VPN service as explained herein that when performed (e.g., when executing) on the processor, operates as explained herein within the computerized device to perform all of the method embodiments and operations explained herein as embodiments of the invention. Thus any computerized device that performs or is programmed to perform up processing explained herein is an embodiment of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing an encrypted multipoint VPN service as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Cisco Systems, Inc. of San Jose, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1A:
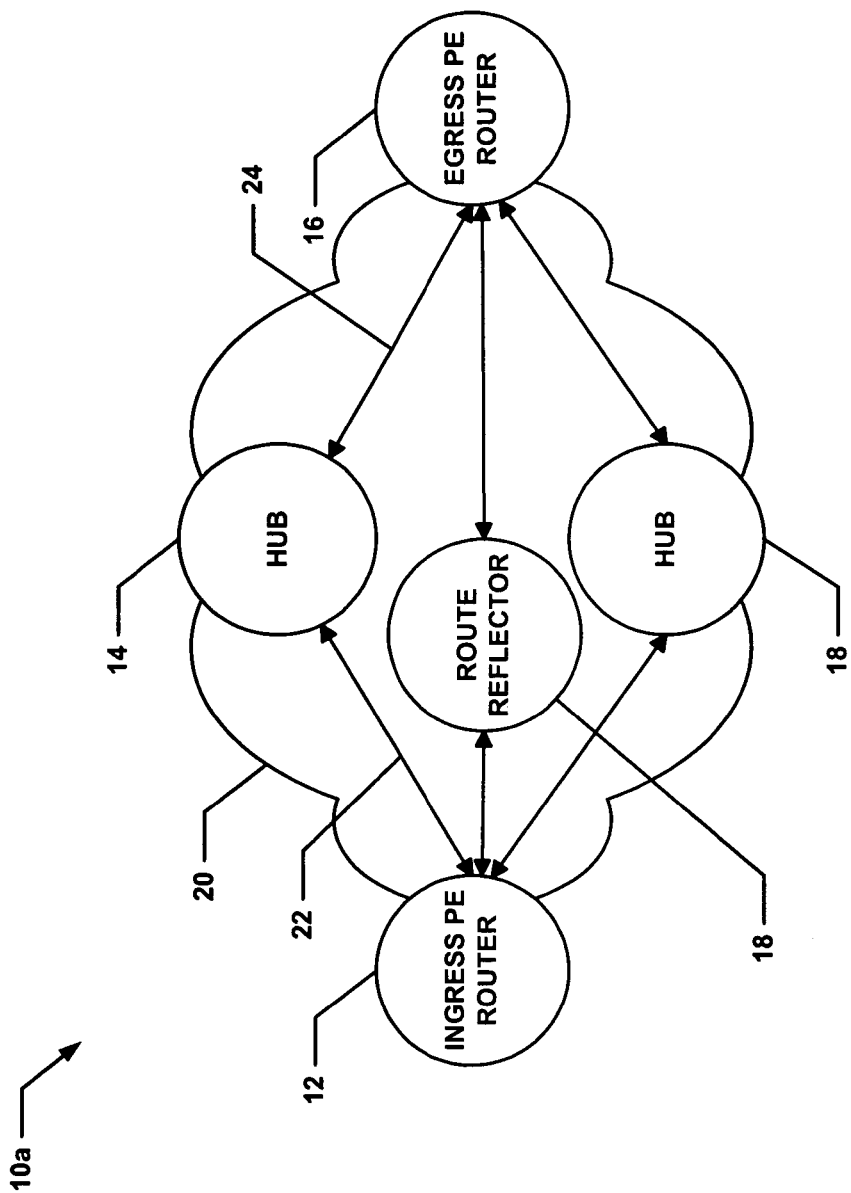
FIG. 1A illustrates a particular environment providing an encrypted multipoint VPN service prior to establishment of the VPN in accordance with embodiments of the invention.

Referring to FIG. 1A, a first environment 10a for providing an encrypted multipoint Virtual Private Network (VPN) service is shown. Environment 10a includes a network 20 having an ingress PE router 12. Ingress PE router 12 receives packets from a customer network (not shown), and provides them to devices in network 20. Network 20 also includes a hub 14 in communication with the ingress PE router 12 and the egress PE router 16. The hub 14 is shown in network 20 and is in communication with ingress PE router 12 by way of communications link 22. Hub 14 is also in communication with the egress PE router 16 by way of link 24. Also shown is another hub 18 which is also in communication with the ingress PE router 12 and the egress PE router 16, and can be used to provide fault tolerance.

Environment 10a further includes a Router Reflector (RR) 26. A route reflector reflects routes between client peers and all the other routers in the system. When the route reflector receives an advertised route from an external BGP speaker, the route is advertised to all clients and non-client peers. When the route reflector receives an advertised route from a non-client peer, the route is advertised to all clients. When the route reflector receives a route from a client, the route is advertised to all clients and non-client peers. As a result, when route reflectors are used, the amount of routing information carried around the network, and in particular, the amount of routing information which any given router must receive and process, is greatly reduced. This greatly increases the scalability of the routing distribution system.

In operation of a particular embodiment of providing an encrypted multipoint VPN service, the ingress PE router 12 receives a first packet of a plurality of packets. The plurality of packets is destined for a remote server in communication with the egress PE router 16. The ingress PE router performs a lookup for a destination prefix of the first packet, and determines that a next-hop for the first packet is reachable through a tunnel (e.g., an mGRE tunnel). The egress PE router 12 then sends a resolution request to hub 14 to acquire a routable IP address associated with the egress PE router 16.

The ingress PE router 12 encapsulates, encrypts and sends the packets to the hub 14 until a resolution reply is received by the ingress PE router 12 from the egress PE router 16 and until security associations (SAs) have been exchanged between the ingress PE router 12 and the egress PE router 16. The packets are sent from ingress PE router 12 to hub 14 via link 22. The hub 14 removes a delivery IP header and tunnel header (e.g., a GRE tunnel header) and utilizes the tunnel IP address to find a corresponding routable IP address in its cache. The hub 14 encrypts and encapsulates a payload IP packet with a label and forwards the packet to the egress PE router 16. The packets carry a bit set in the header (e.g., a routing bit) which indicates that the header further includes a tunnel IP address of the egress PE router 16 which should be used to forward the packets. The packets are then sent from hub 14 to egress PE router 16 via link 24.

Once the ingress PE router 12 receives a resolution reply from the hub 14, the ingress PE router 12 updates a next-hop cache and exchanges IPSec SAs with the egress PE router 16. The ingress PE router 12 also updates an FIB entry with the SAs.

Figure 1B:
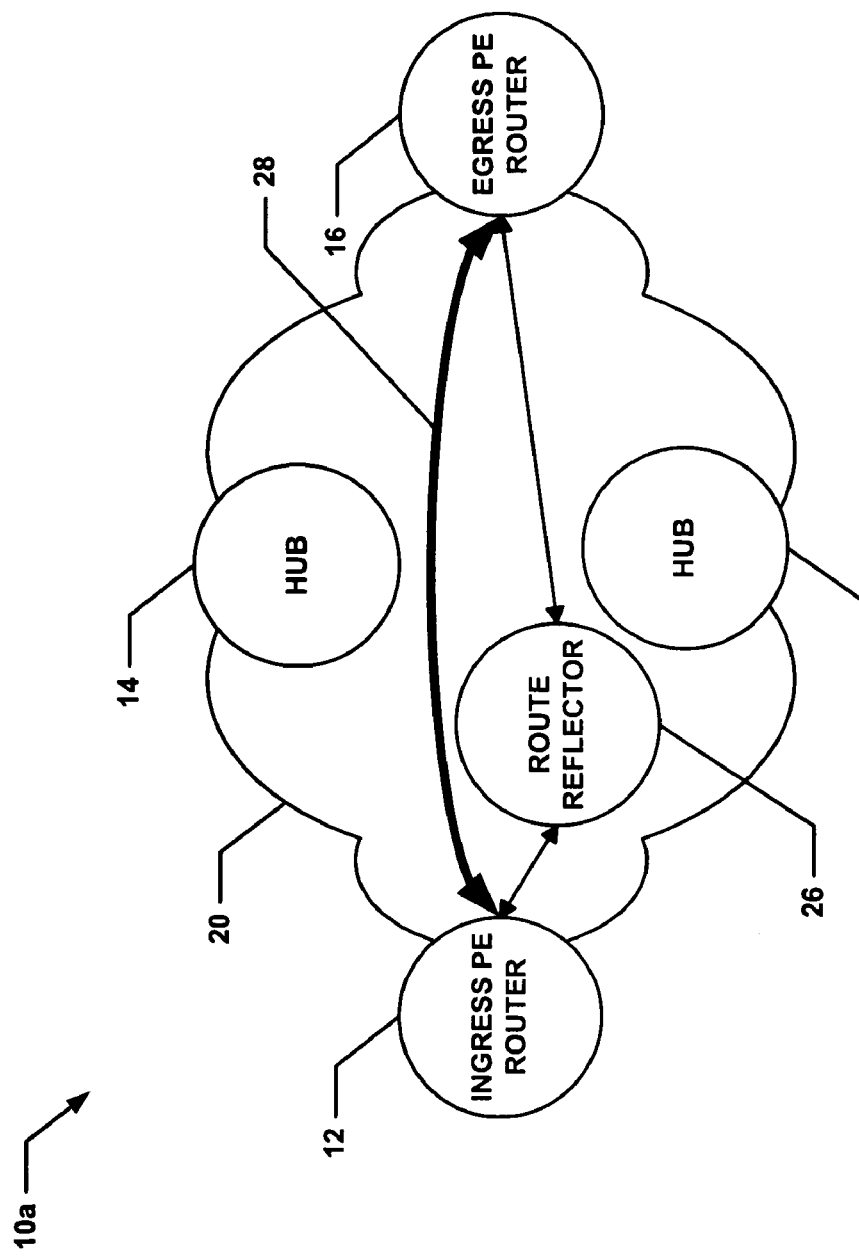
FIG. 1B illustrates a particular environment providing an encrypted multipoint VPN service in accordance with embodiments of the invention.

Referring now to FIG. 1B, a similar environment 10b is shown. A VPN 28 has been established between the ingress PE router 12 and the egress PE router 16. As a result, all subsequent packets of the plurality of packets destined for the egress PE router 16 are forwarded directly towards the egress PE router 16 across VPN 28 established between the egress PE router 16 and the ingress PE router 12.

In an alternate embodiment, the environment 10b further includes a route reflector 26 that is discovered dynamically. Sessions are established with the route reflectors clients to exchange routing information.

In some embodiments the VPN 28 is torn down after the plurality of packets have been forwarded to the egress PE router 16. Alternately, the VPN 28 is maintained when the plurality of packets have been forwarded to the egress PE router 16.

Figure 2A:
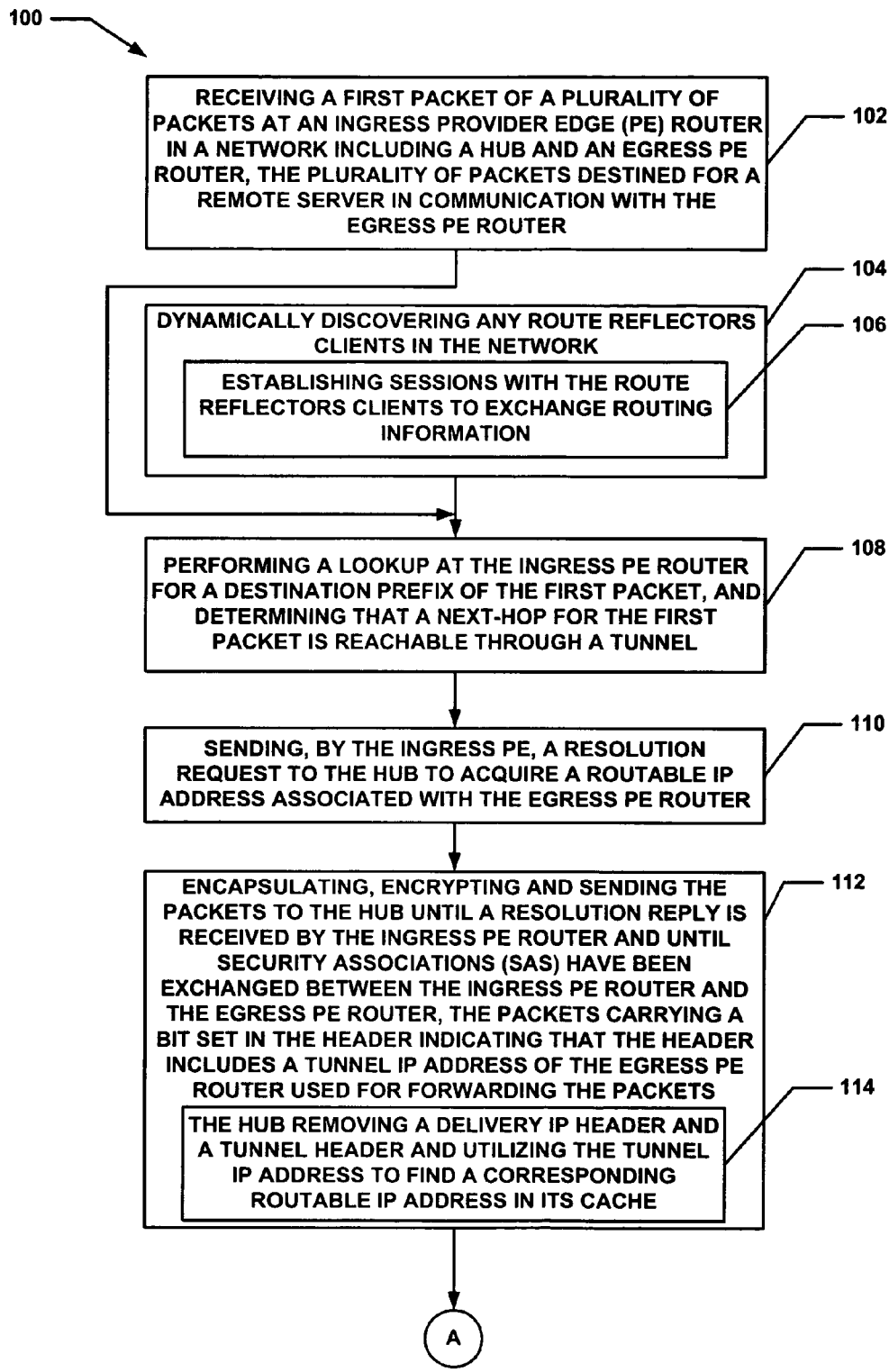
FIGS. 2A and 2B illustrate a flow diagram of a particular embodiment of a method for providing an encrypted multipoint Virtual Private Network (VPN) service in accordance with embodiments of the invention.
Figure 2B:
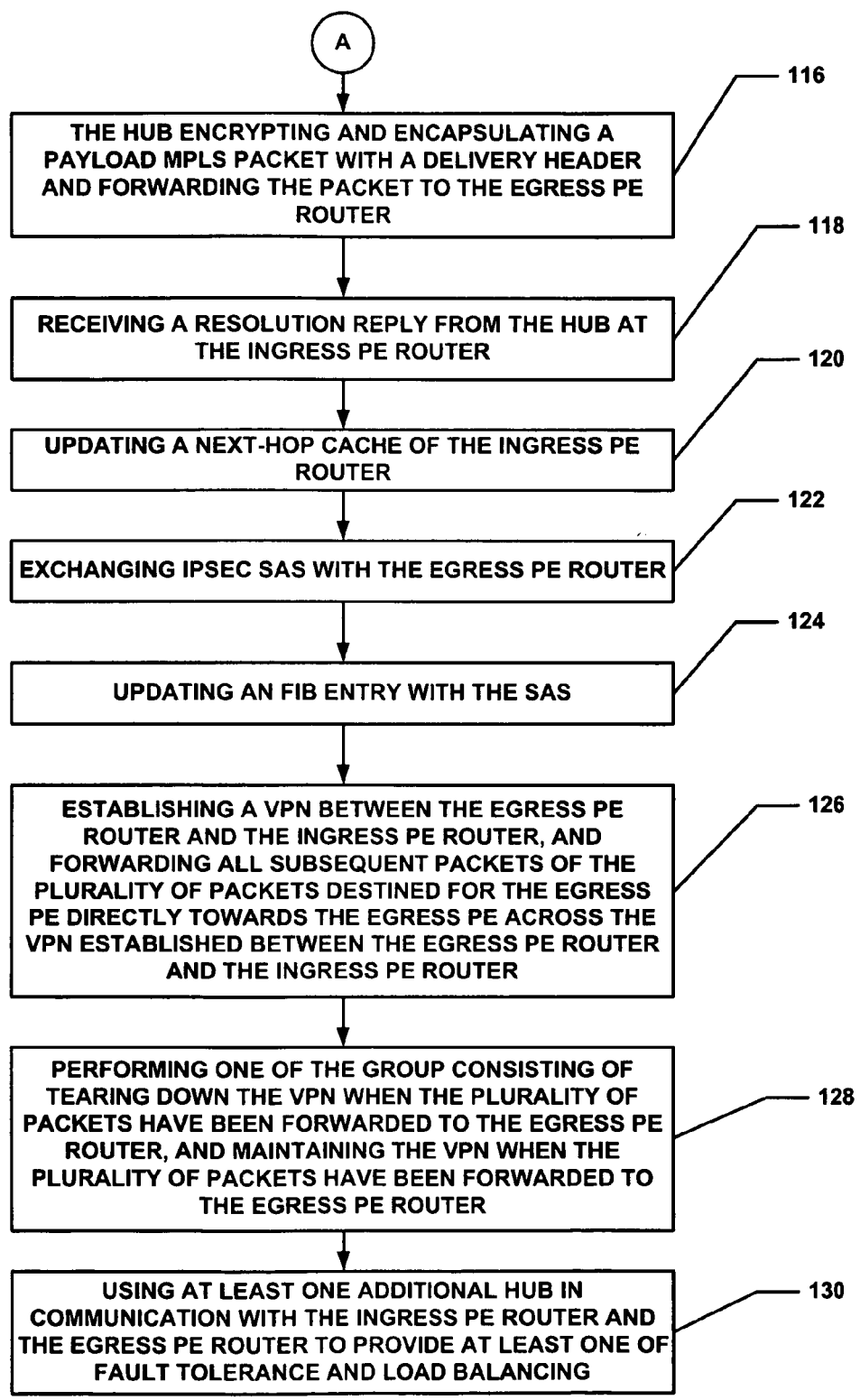

A flow chart of a particular embodiment of the presently disclosed method is depicted in FIGS. 2A and 2B. The rectangular elements are herein denoted "processing blocks" and represent computer software instructions or groups of instructions. Alternatively, the processing blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Referring now to FIGS. 2A and 2B, a method 100 of providing an encrypted multipoint Virtual Private Network (VPN) service is shown. The method begins with processing block 102, wherein a first packet of a plurality of packets is received at an ingress PE router in a network. The network also includes a hub and an egress PE router, and the plurality of packets are destined for a remote server in communication with the egress PE router.

In processing block 104, a lookup for a destination prefix of the first packet is preformed at the ingress PE router. A determination is made regarding whether next-hop for the first packet is reachable through a tunnel.

As recited by processing block 106, the ingress PE router sends a resolution request to the hub. This is done in order to acquire a routable IP address associated with the egress PE router.

As shown in processing block 108, the ingress PE router encapsulates, encrypts and then sends the packets to the hub until a resolution reply is received and until Security Associations (SAs) have been exchanged between the ingress PE router and the egress PE router. The packets carry a routing bit that is set in the header. The header includes a tunnel IP address of the egress PE router. In processing block 110, the hub removes the delivery IP header and tunnel header and utilizes the tunnel IP address to find a corresponding routable IP address in its cache. Processing block 112 discloses the hub encrypting and encapsulating a payload IP packet with a label and then forwarding the packet to the egress PE router.

Processing block 114 recites receiving a resolution reply from the hub at the ingress PE router. Processing block 116 discloses updating a next-hop cache of the ingress PE router.

As shown in processing block 118, IPSec SAs are exchanges between the egress PE router and the ingress PE router. In processing block 120, a FIB entry of the ingress PE router is updated with the SAs.

In processing block 122 a VPN is established between the egress PE router and the ingress PE router. All subsequent packets of the plurality of packets destined for the egress PE router are forwarded directly towards the egress PE router across the VPN established between the egress PE router and the ingress PE router.

In certain embodiments, the process continues with processing block 124 wherein any Route Reflectors clients in the network are dynamically discovered. As shown in processing block 126, the dynamically discovering of RRs further comprises establishing sessions with the RR clients in order to exchange routing information.

In processing block 128, the VPN can be torn down after the plurality of packets have been forwarded to the egress PE router. Alternately, the VPN may be maintained after the plurality of packets have been forwarded to the egress PE router.

In another alternate embodiment, as shown in processing block 130, at least one additional hub is in communication with the ingress PE router and the egress PE router may be used to provide fault tolerance and/or load balancing. In such a manner, an encrypted multipoint Virtual Private Network (VPN) service is provided.

Figure 3:
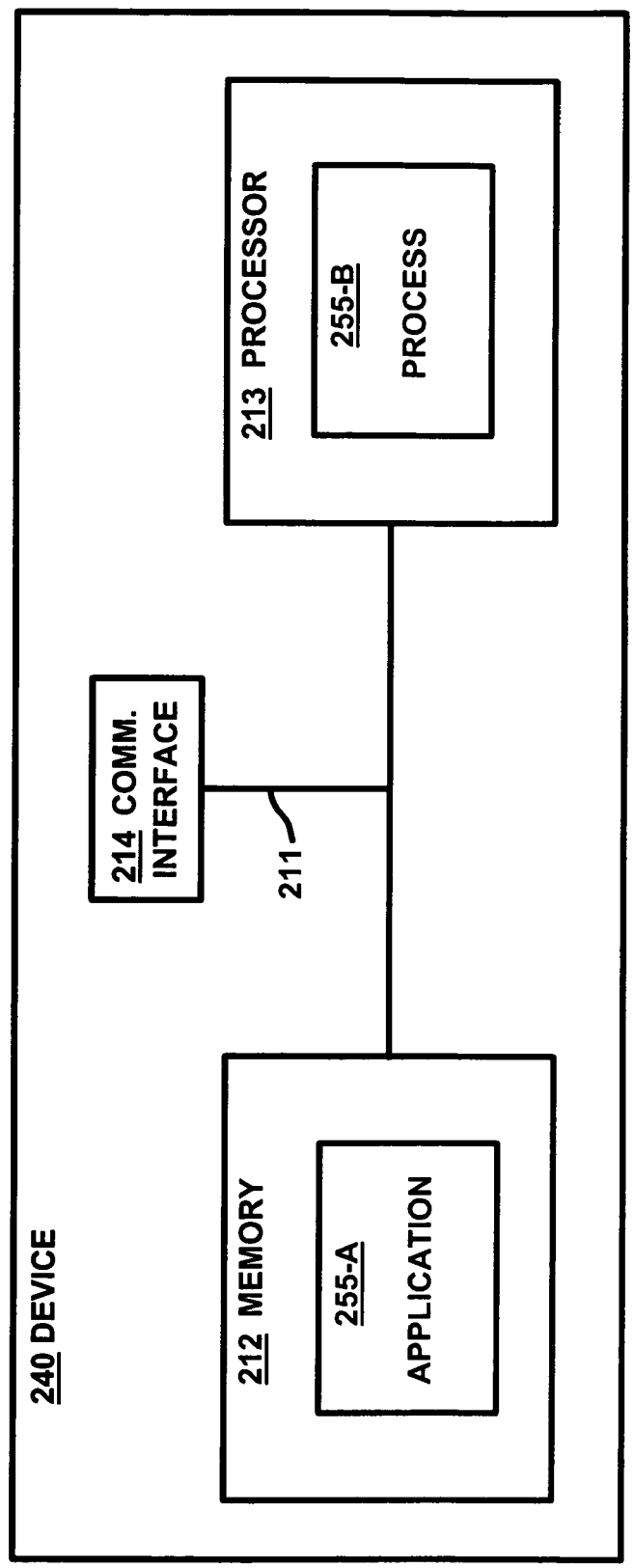
FIG. 3 illustrates an example computer system architecture for a computer system that provides an encrypted multipoint VPN service in accordance with embodiments of the invention.

FIG. 3 illustrates example architectures of a computer system that is configured as a network device 240. The network device 240 may be any type of computerized system such as a personal computer, workstation, portable computing device, mainframe, server or the like. In this example, the system includes an interconnection mechanism 211 that couples a memory system 212, a processor 213, and a communications interface 214. The communications interface 214 allows the computer system 240 to communicate with external devices or systems.

The memory system 212 may be any type of computer readable medium that is encoded with an application 255-A that represents software code such as data and/or logic instructions (e.g., stored in the memory or on another computer readable medium such as a disk) that embody the processing functionality of embodiments of the invention as explained above. The processor 213 can access the memory system 212 via the interconnection mechanism 211 in order to launch, run, execute, interpret or otherwise perform the logic instructions of the applications 255-A for the host in order to produce a corresponding process 255-B. In other words, the process 255-B represents one or more portions of the application 255-A performing within or upon the processor 213 in the computer system.

It is to be understood that embodiments of the invention include the applications (i.e., the un-executed or non-performing logic instructions and/or data) encoded within a computer readable medium such as a floppy disk, hard disk or in an optical medium, or in a memory type system such as in firmware, read only memory (ROM), or, as in this example, as executable code within the memory system 212 (e.g., within random access memory or RAM). It is also to be understood that other embodiments of the invention can provide the applications operating within the processor 213 as the processes. While not shown in this example, those skilled in the art will understand that the network device may include other processes and/or software and hardware components, such as an operating system, which have been left out of this illustration for ease of description of the invention.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that that the invention should not be limited to the described embodiments but rather should be limited only by the spirit and scope of the appended claims.

What is claimed is:

1. A method of providing an encrypted multipoint Virtual Private Network (VPN) service comprising:

receiving a first packet of a plurality of packets at an ingress Provider Edge (PE) router in a network including a hub and an egress PE router, the plurality of packets destined for a remote server in communication with said egress PE router;

performing a lookup at said ingress PE router for a destination prefix of said first packet, and determining that a next-hop for said first packet is reachable through a tunnel;

sending, by said ingress PE router, a resolution request to said hub to acquire a routable Internet Protocol (IP) address associated with said egress PE router;

encapsulating, encrypting and sending a first subset of said plurality of packets to said hub, said first subset of said plurality of packets including packets received until a resolution reply is received by said ingress PE router and until Security Associations (SAs) have been exchanged between said ingress PE router and said egress PE router, said first subset of said plurality of packets carrying a bit set in a header indicating that said header includes a tunnel IP address of said egress PE router which should be used for forwarding said first subset of said plurality of packets;

receiving a resolution reply from said hub at said ingress PE router;

updating a next-hop cache of said ingress PE router;

exchanging IPSec SAs with said egress PE router;

updating an FIB entry with said SAs; and establishing the VPN between said egress PE router and said ingress PE router, and forwarding a second subset of said plurality of packets including all packets subsequent to the first subset of said plurality of packets destined for said egress PE router directly towards said egress PE router across said VPN established between said egress PE router and said ingress PE router.

2. The method of claim 1 wherein said encapsulating further comprises said hub removing a delivery IP header and tunnel header and utilizing said tunnel IP address to find a corresponding routable IP address in its cache.

3. The method of claim 2 further comprising said hub encrypting and encapsulating a payload IP packet with a label and forwarding said payload IP packets to said egress PE router.

4. The method of claim 1 further comprising dynamically discovering any route reflectors clients in said network.

5. The method of claim 4 wherein said dynamically discovering further comprises establishing sessions with said route reflectors clients to exchange routing information.

6. The method of claim 1 further comprising performing one of a group consisting of tearing down said VPN when the plurality of packets have been forwarded to said egress PE router, and maintaining said VPN when the plurality of packets have been forwarded to said egress PE router.

7. The method of claim 1 further comprising using at least one additional hub in communication with said ingress PE router and said egress PE router to provide at least one of fault tolerance and load balancing.

8. A computer readable medium having computer readable code thereon for providing an encrypted multipoint Virtual Private Network (VPN) service, the medium comprising:

instructions for receiving a first packet of a plurality of packets at an ingress Provider Edge (PE) router in a network including a hub and an egress PE router, the plurality of packets destined for a remote server in communication with said egress PE router;

instructions for performing a lookup at said ingress PE router for a destination prefix of said first packet, and determining that a next-hop for said first packet is reachable through a tunnel;

instructions for sending, by said ingress PE router, a resolution request to said hub to acquire a routable Internet Protocol (IP) address associated with said egress PE router;

instructions for encapsulating, encrypting and sending a first subset of said plurality of packets to said hub, said first subset of said plurality of packets including packets received until a resolution reply is received by said ingress PE router and until Security Associations (SAs) have been exchanged between said ingress PE router and said egress PE router, said first subset of said plurality of packets carrying a bit set in a header that indicates said header includes a tunnel IP address of said egress PE router to be used for forwarding said first subset of said plurality of packets;

instructions for receiving a resolution reply from said hub at said ingress PE router;

instructions for updating a next-hop cache of said ingress PE router;

instructions for exchanging IPSec SAs with said egress PE router;

instructions for updating an FIB entry with said SAs; and instructions for establishing the VPN between said egress PE router and said ingress PE router, and forwarding a second subset of said plurality of packets including all packets subsequent to the first subset of said plurality of packets destined for said egress PE router directly towards said egress PE router across said VPN established between said egress PE router and said ingress PE router.

9. The computer readable medium of claim 8 wherein said instructions for encapsulating further comprises instructions for said hub for removing a delivery IP header and tunnel header and utilizing said tunnel IP address to find a corresponding routable IP address in its cache.

10. The computer readable medium of claim 9 further comprising instructions for said hub encrypting and encapsulating a payload IP packet with a label and forwarding said payload IP packet to said egress PE router.

11. The computer readable medium of claim 8 further comprising instructions for dynamically discovering any route reflectors clients in said network.

12. The computer readable medium of claim 11 further comprising instructions for establishing sessions with said route reflectors clients to exchange routing information.

13. The computer readable medium of claim 8 further comprising instructions for performing one of a group consisting of tearing down said VPN when the plurality of packets have been forwarded to said egress PE router, and maintaining said VPN when the plurality of packets have been forwarded to said egress PE router.

14. The computer readable medium of claim 8 further comprising instructions for using at least one additional hub in communication with said ingress PE router and said egress PE router to provide at least one of fault tolerance and load balancing.

15. An ingress Provider Edge (PE) router comprising:
a memory;
a processor;
a communications interface;
an interconnection mechanism coupling the memory, the processor and the communications interface; and
wherein the memory is encoded with an application providing an encrypted multipoint Virtual Private Network (VPN) service that when performed on the processor, provides a process for processing information, the process causing the computer system to perform the operations of:
receiving a first packet of a plurality of packets in a network including a hub and an egress Provider Edge (PE) router, the plurality of packets destined for a remote server in communication with said egress PE router;
performing a lookup at said ingress PE router for a destination prefix of said first packet, and determining that a next-hop for said first packet is reachable through a tunnel;
sending a resolution request to said hub to acquire a routable Internet Protocol (IP) address associated with said egress PE router;
encapsulating, encrypting and sending a first subset of said plurality of packets to said hub until a resolution reply is received and until Security Associations (SAs) have been exchanged between said ingress PE router and said egress PE router, said first subset of said plurality of packets carrying a bit set in a header indicating that said header includes a tunnel IP address of said egress PE router which should be used for forwarding said first subset of said plurality of packets;
receiving a resolution reply from said hub;
updating a next-hop cache;
exchanging SAs with said egress PE router;
updating an FIB entry with said SAs; and
establishing the VPN with said ingress PE router, and forwarding a second subset of said plurality of packets including all packets subsequent to the first subset of said plurality of packets destined for said egress PE router directly towards said egress PE router across said VPN established between said egress PE router and said ingress PE router.

16. The ingress PE router of claim 15 wherein said ingress PE router performs one of a group consisting of tearing down said VPN when the plurality of packets have been forwarded to said egress PE router, and maintaining said VPN when the plurality of packets have been forwarded to said egress PE router.

17. The ingress router of claim 15 wherein said ingress PE router dynamically discovers any route reflectors clients in said network, and establishes sessions with said route reflectors clients to exchange routing information.

18. A hub comprising:
a memory;
a processor;
a communications interface;
an interconnection mechanism coupling the memory, the processor and the communications interface; and
wherein the memory is encoded with an application providing an encrypted multipoint Virtual Private Network (VPN) service that when performed on the processor, provides a process for processing information, the process causing the computer system to perform the operations of:
receiving, from an ingress Provider Edge (PE) router, a resolution request to provide a routable Internet Protocol (IP) address associated with said egress PE router;
receiving packets at said hub until a resolution reply is sent to said ingress PE router and until Security Associations (SAs) have been exchanged between said ingress PE router and said egress PE router, said packets carrying a bit set in a header indicating that said header includes a tunnel IP address of said egress PE router which should be used for forwarding said packets; and
providing a resolution reply to said ingress PE router.

19. The hub of claim 18 further performing the operation of removing a delivery IP header and a tunnel header and utilizing said tunnel IP address to find a corresponding routable IP address in its cache.

20. The hub of claim 18 further performing the operation of encrypting and encapsulating a payload IP packet with a label and forwarding said packet to said egress PE router.

* * * * *